(12) United States Patent
Sims et al.

(10) Patent No.: US 8,770,357 B2
(45) Date of Patent: Jul. 8, 2014

(54) DAMPERS FOR MOUNTAIN BIKES

(75) Inventors: Neil David Sims, Sheffield (GB); David Craig Batterbee, Sheffield (GB)

(73) Assignee: University of Sheffield, Sheffield (GB)

( * ) Notice: Subject to any disclaimer, the term of this patent is extended or adjusted under 35 U.S.C. 154(b) by 629 days.

(21) Appl. No.: 13/054,387

(22) PCT Filed: Jul. 16, 2009

(86) PCT No.: PCT/GB2009/050863
§ 371 (c)(1),
(2), (4) Date: Jan. 14, 2011

(87) PCT Pub. No.: WO2010/007433
PCT Pub. Date: Jan. 21, 2010

(65) Prior Publication Data
US 2011/0127706 A1  Jun. 2, 2011

(30) Foreign Application Priority Data

Jul. 16, 2008 (GB) .................................. 0813005.6

(51) Int. Cl.
*F16F 9/53* (2006.01)

(52) U.S. Cl.
USPC ..................... 188/267.1; 188/267.2

(58) Field of Classification Search
USPC .............. 188/266, 267, 267.1–267.2; 701/37; 280/5.5
See application file for complete search history.

(56) References Cited

U.S. PATENT DOCUMENTS

| | | | |
|---|---|---|---|
| 4,953,089 A * | 8/1990 | Wolfe | 702/142 |
| 5,009,402 A * | 4/1991 | Sato | 267/140.14 |
| 5,996,745 A | 12/1999 | Jones, Jr. et al. | |
| 5,999,868 A * | 12/1999 | Beno et al. | 701/37 |
| 6,311,110 B1 * | 10/2001 | Ivers et al. | 701/37 |
| 6,343,676 B1 * | 2/2002 | Achmad | 188/299.1 |
| 6,978,872 B2 | 12/2005 | Turner | |
| 7,340,334 B2 * | 3/2008 | Izawa et al. | 701/37 |
| 7,350,787 B2 * | 4/2008 | Voss | 280/5.5 |
| 7,942,248 B2 * | 5/2011 | St. Clair et al. | 188/267.1 |
| 2004/0215380 A1 * | 10/2004 | Song | 701/37 |
| 2006/0016649 A1 * | 1/2006 | Gordaninejad et al. | 188/267 |
| 2006/0173592 A1 | 8/2006 | Gade et al. | |
| 2008/0093820 A1 | 4/2008 | McAndrews | |

FOREIGN PATENT DOCUMENTS

| | | |
|---|---|---|
| EP | 1564040 | 8/2005 |
| FR | 2674304 | 9/1992 |

(Continued)

OTHER PUBLICATIONS

International Preliminary Report on Patentability and Written Opinion as prepared by The International Bureau of WIPO, for International Application No. PCT/GB2009/050863, dated Jan. 18, 2011, 7 pages.

*Primary Examiner* — Christopher Schwartz
(74) *Attorney, Agent, or Firm* — Ryan O. White; Taft Stettinius & Hollister, LLP

(57) ABSTRACT

An apparatus of a damper (46) for a bicycle comprising a housing defining a chamber, and a piston, movable in the chamber along a first direction. The apparatus further comprises a controllable means to vary the resistance to movement of the piston in the chamber, a sensor (62), and a controller (58) including a timer. Said sensor measures at least one dynamic quantity and produces an output signal based thereon. Said output signal is received by the controller, and said controller controls said controllable means based on said dynamic quantity as a function of time to control the level of damping. The invention further provides means for manually adjusting the level of rebound damping.

34 Claims, 8 Drawing Sheets

(56) References Cited

FOREIGN PATENT DOCUMENTS

| | | |
|---|---|---|
| GB | 2382638 | 6/2003 |
| WO | WO-95/29838 | 11/1995 |
| WO | WO-98/56642 | 12/1998 |
| WO | WO-2004/033280 | 4/2004 |
| WO | WO-2007/009341 | 1/2007 |

* cited by examiner

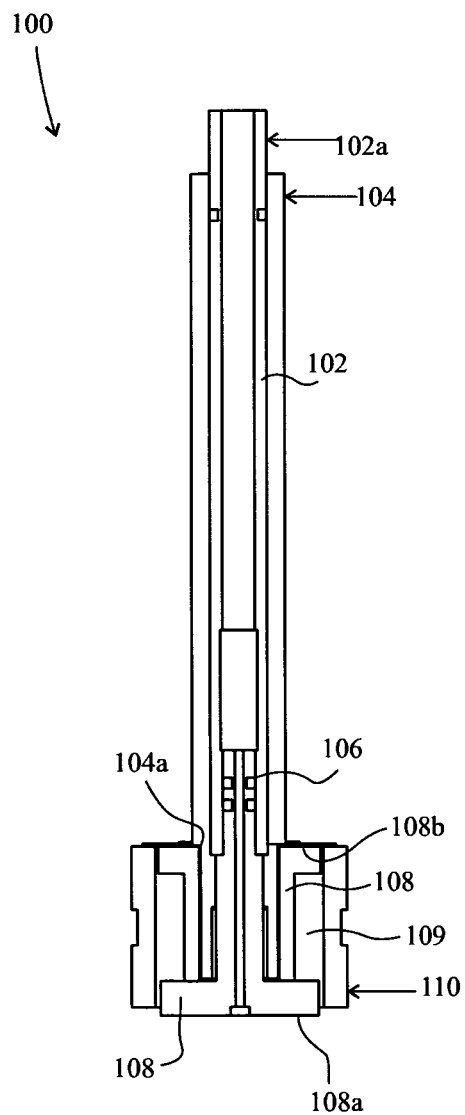
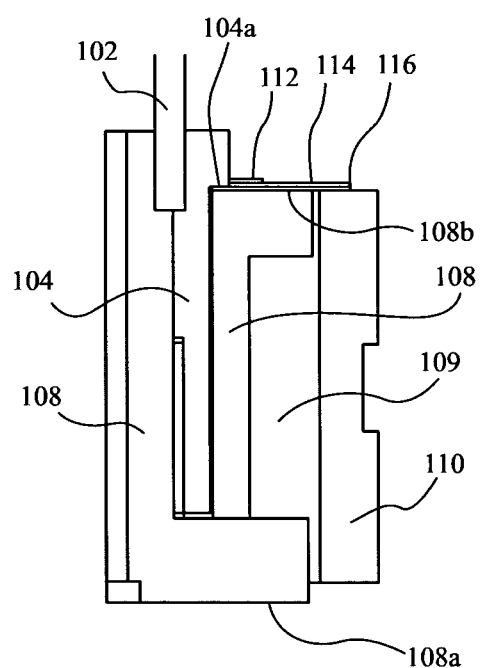
Fig. 8A
Fig. 8B

DAMPERS FOR MOUNTAIN BIKES

This invention relates to dampers and in particular to an improved damper system for use with bicycle shock absorbers.

BACKGROUND

Mountain biking is a popular recreational and competitive sport that involves riders travelling over various terrain. To improve rider comfort, most modern mountain bikes are now equipped with suspension systems that aim to absorb bumps and vibrations and improve handling performance. Such suspension systems include energy storage and dissipation elements integrated onto the bicycle frame, which minimise the transmission of vertical perturbations to the rider. Examples include coil or gas springs for energy storage and liquid or gas based dampers for energy dissipation.

The suspension system components above the shock absorber (front triangle, rider mass etc) are often referred to as the sprung mass, whilst the components below the shock absorber are often referred to as the unsprung mass (wheel, tyre etc). Movement of the sprung mass towards the unsprung mass is known as compression, whilst movement of the sprung mass away from the unsprung mass is known as rebound. Damping is included in both rebound and compression in order to control rider comfort and handling, and this is usually provided in disproportionate amounts.

To those skilled in the art, it is well known that larger damping rates are desirable in rebound than in compression. In general, lower compression damping rates help minimise the transmission of force to the rider when hitting a bump, thus preventing ride harshness. In rebound, higher damping rates prevent excessive sprung/unsprung mass velocities when the stored spring energy is released. Furthermore, optimum rebound damping rates vary substantially according to rider mass, frame design, and the terrain being traversed by the rider. Using terrain as an example, whilst traversing high frequency bumps a lower rebound damping rate is desirable. On passing the crest of a bump, lower rebound damping permits the suspension to quickly restore itself in preparation for the next obstacle, and maximises wheel to ground contact. A rebound damping rate that is too high in this situation would cause the suspension to 'pack down' over subsequent bumps because it has insufficient time to rebound before the next obstacle. This can lead to poor handling as the wheel may skip between bumps resulting in periods of zero wheel contact force. Furthermore, passenger discomfort is degraded due to the more compressed state of the spring, which transmits larger forces to the rider. On the other hand, whilst traversing lower frequency bumps, a higher rebound damping rate is desirable in order prevent excessive vertical motions. As a consequence, many bicycle rear shock absorbers incorporate the facility for manual rebound damping adjustment.

However, when a bike fitted with a suspension system is ridden on a smooth terrain, for example on a road, the suspension system will dissipate some energy input by the rider pedalling. For example, pedalling motion causes the suspension system to compress and extend as a function of the pedalling frequency. This phenomenon is known as "pedal bobbing". The energy used in this way does not contribute to the forward propulsion of the bicycle and so reduces the efficiency of each rotation of the pedals. Therefore, the benefits gained from using a conventional suspension system on rough terrain come at the expense of reduced rider efficiency when travelling on smooth terrain.

Pedal bob is a known problem in the art and has prompted manufacturers to put forward a wide range of solutions to counter it. Some solutions revolve around advanced frame geometries whilst others focus specifically on the design of shock absorbers.

For example, U.S. Pat. No. 6,978,872 describes a suspension damper comprising a stable platform valve (SPV) assembly that only allows compression of the damper when the applied force exceeds a threshold value. This is effective in countering pedal bob since pedal bob is a low velocity phenomenon and is generally insufficient to exceed the required threshold. Due to the threshold requirement of the U.S. Pat. No. 6,978,872 damper, bump absorption is compromised when travelling over rougher terrain.

WO-A-95/29838 also identifies the problems associated with pedal bob on a cycle fitted with a damping system. The characteristics of the suspension system disclosed therein are dependent on whether the rider is sitting or standing out of the saddle. It is reasoned that pedal bob is more significant when the rider is riding out of the saddle since the rider's weight is placed primarily on the pedals. The distribution of the rider's weight on various mechanical components causes the responsiveness of the shock absorber to change accordingly.

The document WO-A-2004/033280 discloses an "anti-bob" system for controlling the shock absorbing devices of a cycle. A detector detects the torque applied to the crank axle (i.e. the pedal axle) or the pressure between the rider's feet and the pedals, and then produces a control signal in response. The control signal then controls the activation of a controllable shock damping device.

A shock absorber system adapted for differentiating between rider-induced forces and terrain-induced forces is disclosed in US-A-2008/0093820. The shock absorber described therein has two fluid chambers connected by a hose. An inertial valve opens in response to terrain-induced forces, providing fluid communication between the two chambers, and provides softer damping.

U.S. Pat. No. 5,996,745 provides a controllable damper system that includes a fluid filled cylinder comprising a valve having a piezoelectric bender. A sensor monitors the displacement and velocity of a piston within the cylinder and controllably applies a voltage to the bender in response. The stiffness of the bender changes in accordance with the applied voltage and affects the rate at which damping fluid flows through flow channels within the chamber thereby affecting the damping characteristics. This device is based upon the principle of controllable orifice damping which serves to increase high velocity damping and is less effective at low velocities.

Magnetorheological (MR) fluids are known. They comprise a suspension of micron-sized ferromagnetic particles distributed in a carrier liquid. When a magnetic field is applied to a MR fluid, the ferromagnetic particles align along the lines of magnetic flux forming chain like structures. The degree of alignment is proportional to the magnitude of the applied magnetic field. It is found that when a magnetic field is applied to a MR fluid, the chains of ferromagnetic particles restrict movement of the fluid transverse the chains, thereby increasing its apparent viscosity. This increase in apparent viscosity occurs due to the development of a yield stress within the fluid. Those skilled in the art will understand that this flow behaviour is similar to that of a Bingham plastic. In the absence of a magnetic field, the fluid behaves in a Newtonian manner. Electrorheological (ER) fluids under the influence of an electric field behave in a similar manner to MR fluids under the influence of a magnetic field.

WO-A-2007/009341 discloses an MR damper with at least one sensor embedded therein for monitoring an external force exerted thereon. In response, a signal is generated which controls the magnetic field and hence the resulting yield force and rheological damping of the damper.

An application of MR dampers in vehicles is disclosed WO 98/56642. In this case, the MR damper system is specifically adapted to enhance the effectiveness of the suspension on vehicle cabs. One or more sensors measure quantities including the cab displacement, speed, steering angle, level of braking, throttle position, and vertical and lateral acceleration. A controller processes information from the sensors to determine an appropriate current to be supplied to an MR filled fluid damper.

A system for controlling a damper arrangement for an engine or transmission is described in US-A-2006/0173592. This document discloses a real-time varying MR damping system which aims to provide optimal damping around the resonance frequency of the given body/engine design. Accelerometers act as vibration sensors and produce input signals which alter the magnitude of a current, thus controlling the level of damping of the MR mount.

Similarly, GB-A-2382638 discloses a vehicle MR damper comprising coaxial cylinders where the viscosity of the MR fluid is controlled in response to measured parameters.

"TRAIL-TRONIC"® produced by GERMAN ANSWER bike technology GmbH & Co. KG (http://www.german-a.de/en/) is a fully integrated electronically controlled suspension system for mountain bikes. A sensor mounted on the front wheel measures its vertical acceleration and controls the level of suspension provided by the rear suspension. The system allows the user to choose the threshold limit at which the suspension locks out.

It is an object of the present invention to provide a controllable damper system that is simple in construction and compact, allowing easy installation on the frame of a bicycle, wherein the level of damping is automatically adjusted to its optimum level depending on the type of terrain the rider is riding on. Generally it is desirable for the damping system to provide sufficient damping when travelling over rough terrain, but to adapt to efficiently minimise the effects of pedal bob when travelling over smooth terrain. ER/MR fluids are particularly suitable in the context of the present invention because they exhibit inherently suitable low velocity flow characteristics that can be utilised to resist pedal bob motions.

A further object of the present invention is to provide a damper wherein the level of rebound damping can be manually adjusted by the user leaving the level of compression damping substantially unchanged.

BRIEF SUMMARY OF THE DISCLOSURE

In accordance with a first aspect of the present invention there is provided an apparatus of a damper for a bicycle comprising
  a housing defining a chamber;
  a piston, movable in the chamber along a first direction
  controllable means to vary the resistance to movement of the piston in the chamber;
  a sensor; and
  a controller including a timer, wherein
  said sensor measures at least one dynamic quantity and produces an output signal based thereon;
  said output signal is received by the controller; and
  said controller controls said controllable means based on said dynamic quantity as a function of time to control the level of damping.

In a preferable embodiment, said function is based on said dynamic quantity satisfying a threshold value on sufficient occasions within a specific time period. In an alternative preferable embodiment, said function is based on said dynamic quantity satisfying a threshold value twice within a specific time period. In both preferable embodiments, said threshold value is preferably satisfied when said dynamic quantity exceeds said threshold value.

In one preferable embodiment, said specific time period is adjustable by the user. In an alternative preferable embodiment, said damper actively adjusts said time period in response to a measured quantity. Preferably said measured quantity is the pedalling frequency, f, which is preferably measured by a cadence meter. Alternatively, the pedalling frequency can preferably be measured by Fourier transforming a measured set of time dependent variables. Preferably said specific time period is between $1/(2.5\ f)$ and $1/(1.7\ f)$ or is between 0.3 and 0.4 seconds. It is preferable that the level of damping is adjusted within a time scale that is short enough for the effects of pedal bob not to be felt.

In one preferable embodiment, said threshold value is adjustable by the user. Alternatively, said threshold value is preferably a function of a second dynamic quantity which is preferably a function of the level of damping. This will allow the threshold by which a 'bump' is defined to be automatically adjusted depending on the level of damping. For example, depending on the level of damping, a single bump will be measured differently by a sensor mounted onto the damper. An alternative preferable second dynamic quantity is the forward velocity of the bicycle. This is desirable because previously insignificant bumps can generate large accelerations whilst travelling at high speed.

It is preferable that said threshold value and specific time period be such that when incorporated into the present invention, the damper is controlled so as to provide high damping (hard suspension) when the rider is riding on smooth ground, and low damping (soft suspension) when the rider is riding on rough ground.

It is preferable that said apparatus further comprises a fluid having variable apparent viscosity in the chamber displaced by the piston, wherein the damping properties of the damper are affected by the apparent viscosity of the fluid; and said controllable means comprises a pole associated with the chamber that changes the apparent viscosity of the fluid when activated.

In a preferable embodiment of the invention, said fluid is a magnetorheological fluid and said pole is a magnetic pole. In an alternative preferable embodiment of the invention, said fluid is an electrorheological fluid and said pole is an electric pole. The skilled user will appreciate that magnetorheological systems are similar in many respects to electrorheological systems and so the ideas and principles detailed in the present application may be equally applicable to either system.

Preferably said dynamic quantity is a function of acceleration. For example, said dynamic quantity may be acceleration, force, torque or inertia. The quantity measured should be one that is indicative, when established in a time dependent context, of the type of terrain over which the bicycle is moving.

It is preferable that said output signal is an analogue signal and is preferably passed through a signal conditioning filter and/or an analogue-to-digital converter prior to being received by said controller. Preferably said signal conditioning filter is an anti-aliasing filter.

In an alternative preferable embodiment, said output signal is a digital signal. An example of a digital signal would be that provided by an inertia switch.

Preferably said controller activates the pole by means of a switching circuit, where said switching circuit is preferably a relay circuit. The skilled reader will appreciate that any switching means will suffice, provided that the desired result of appropriate activation is achieved.

Alternatively, it is preferable that said controller activates the pole by varying the current such that it may have any value between an upper and lower limit. It is further preferable that said upper limit be a function of said output signal. The rate of change of current supplied to said pole is preferably controlled by an RCL (resistor-capacitor-inductor) circuit.

In one preferable embodiment, said specific time period is measured by said timer being actuated upon the first occurrence of said dynamic quantity satisfying said threshold value.

Said fluid preferably has a first apparent viscosity when said dynamic quantity satisfies said threshold value, and preferably has a second apparent viscosity when said dynamic quantity does not satisfy said threshold value. Preferably said first apparent viscosity is less than said second apparent viscosity. These conditions therefore allow the control logic to adjust the level of damping according to the type of terrain being traversed.

Preferably, said damper acts to dampen the motion of a spring where said spring is a preferably a coiled spring or a gas spring.

In a second aspect of the present invention, there is provided an apparatus of a damper comprising a piston having
   a shaft;
   a bobbin mounted at a bottom end of said shaft, wherein said bobbin is connected to and circumscribed by a bobbin ring;
   a discontinuous annular orifice intermediate said bobbin and bobbin ring;
   a shim stack comprising two or more shims, said shims extending across said annular orifice; wherein
      said shims can flex permitting substantially unrestricted fluid flow through said annular orifice during a compression stroke, but are prevented from flexing during a rebound stroke, thereby restricting fluid flow through said annular orifice;
      said shims comprise apertures that in combination form a fluid passageway, where said fluid passageway is in fluid communication with said annular orifice,
   and said shims are movable with respect to one another such that the size of said fluid passageway is adjustable thereby adjusting the rate of fluid flow through said annular orifice.

Preferably said apparatus further comprises a rotating rod journalled for rotation in said shaft, wherein said movable shim is connected to said rotating rod such that rotation of said rotating rod causes rotation of said movable shim relative said remaining shim or shims.

The second aspect of the invention provides a piston that provides a greater level of damping to the rebound stroke than it provides to the compression stroke. Such a feature is preferable as it enhances rider comfort and bicycle handling. The second aspect of the invention further provides a system whereby the level of rebound damping can be adjusted by the user. Adjustable rebound damping is preferable as it is allows the rider to adjust the damping level to accommodate for the type of bicycle, rider weight and terrain type.

In a third aspect of the invention, there is provided a damper in accordance with the first aspect of the invention further comprising the features of a damper in accordance with the second aspect of the invention.

It is preferable that the first, second or third aspect of the present invention provides an integrated stand alone unit that can be retrofitted to existing bicycles. With regards to the first and third aspects of the present invention, it is preferable that said sensor and controller are integrated on the housing providing a compact arrangement that is minimally disruptive to other systems of the bicycle.

BRIEF DESCRIPTION OF THE DRAWINGS

Embodiments of the invention are further described hereinafter with reference to the accompanying drawings, in which:

FIG. 8A shows a modified shaft and bobbin assembly with a shim stack non-return valve, with FIG. 8B showing a more detailed view of the shim stack.

DETAILED DESCRIPTION

Figure 1:
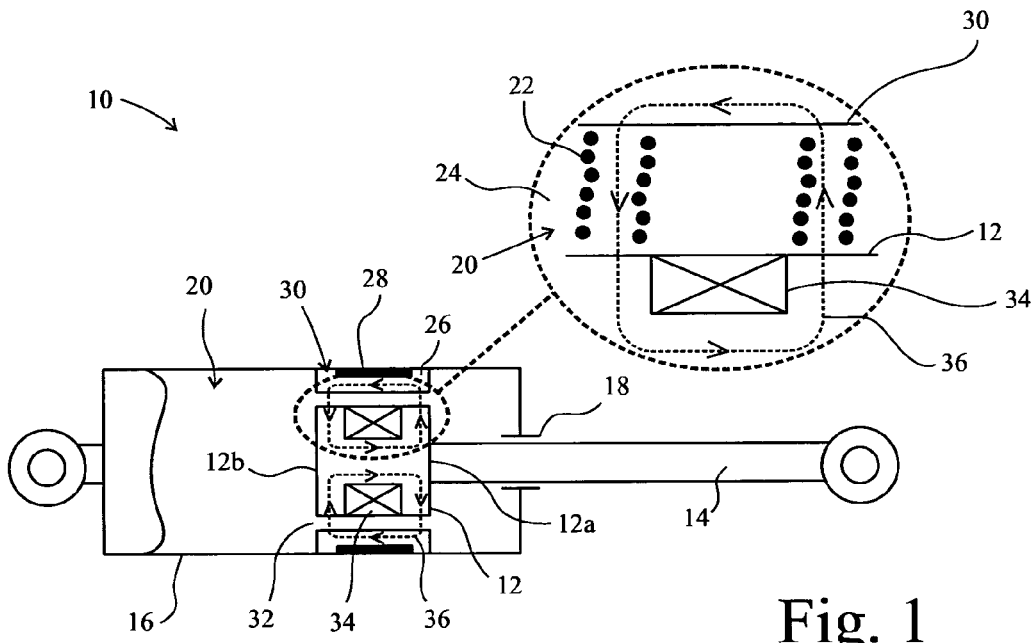
FIG. 1 is a cross sectional side view of a typical magnetorheological (MR) damper.

FIG. 1 shows a typical magnetorheological (MR) damper 10 forming part of the prior art. The damper 10 comprises a bobbin 12 attached at one end of a shaft 14. The bobbin 12 is disposed within a chamber 16 containing MR fluid 20. The MR fluid consists of a suspension of micron-sized ferromagnetic particles 22 (see FIG. 1 insert) distributed in a carrier liquid 24.

The shaft 14 extends from within the chamber 16 through an opening 18 that comprises a seal. The seal ensures that the chamber 16 remains fluid tight whilst allowing the shaft 14 and bobbin 12 to slidably move along a direction parallel the length of the shaft 14. The bobbin has a proximal end 12a proximal the opening 18 and a distal end 12b, distal the opening 18.

The bobbin 12 is connected to and circumscribed by a bobbin ring 30 such that the bobbin ring 30 moves collectively with the bobbin within the chamber 12. The bobbin ring 30 is attached to the bobbin 12 by connectors (not shown) and spaced apart from the bobbin 12 by an annular orifice 32. The bobbin ring has a seal 28 around its outer circumference and a low magnetic reluctance component 26, which may comprise soft iron. The seal 28 prevents fluid from flowing between the bobbin ring 30 and inner wall of the chamber 16. Fluid can only move from one side of the bobbin 12 to the other by passing through annular orifice 32.

The bobbin 12 includes an electromagnetic coil 34 that is connected to a power source (not shown) externally from the chamber 16. Cables linking the coil 34 to the power source may run through a bore in the shaft 14. When the coil 34 is energised a magnetic field is produced with flux (indicated by flux lines 36) circumscribing the wires of the coil 34. The flux lines 36 pass from the bobbin 12 across the annular orifice 32

(through the MR fluid 20, which generally has a high magnetic reluctance), and penetrates the low magnetic reluctance component 26 of the bobbin ring 30 before returning to the bobbin 12 via the annular orifice 32. The low magnetic reluctance component 26 therefore acts as a flux return component and these two terms will be used interchangeably hereinafter.

As shown more clearly in the inset of FIG. 1, the magnetic field causes the ferromagnetic particles 22 of the MR fluid 20 to align along the lines of magnetic flux 36 forming particle chains. The formation of particle chains changes the fluid yield stress of the MR fluid and hence changes the damping properties of the damper 10. Since the extent of alignment is dependent upon the magnitude of the magnetic field, the damper shown in FIG. 1 provides a system in which the fluid yield stress is controllable by adjustment of the current supplied to the coil 34.

When the suspended ferromagnetic particles 22 are aligned along the lines of magnetic flux 36, the apparent viscosity of the MR fluid 20 increases.

It should be noted that although the alignment of the ferromagnetic particles 22 causes the apparent viscosity of the MR fluid to increase, the actual physical viscosity of the fluid does not change.

Since the MR fluid 20 generally has the highest magnetic reluctance along the flux path, the size of the annular orifice 32 in a radial direction has a significant impact on the magnitude of the magnetic field required to align the ferromagnetic particles 22 of the MR fluid 20.

Figure 2A:
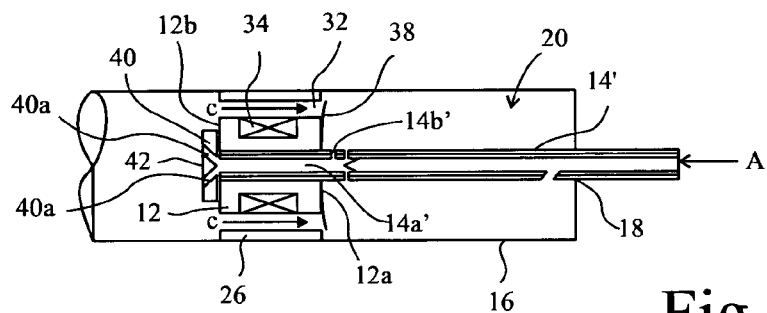
FIGS. 2a and 2b show the compression and rebound circuits respectively of a modified MR damper.
Figure 2B:
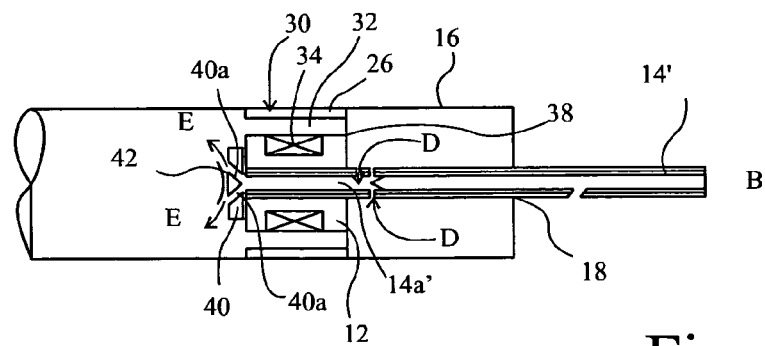

The present invention incorporates a MR damper as described above with reference to FIG. 1, and may include modified flow paths. FIGS. 2A and 2B show a MR damper with modified flow paths and represent one particular embodiment of a damper that may be used with the present invention. The skilled person will appreciate, however, that the present invention is not limited to dampers of the kind described with reference to FIGS. 2A and 2B and that any suitable MR damper may be used.

The damper shown in FIGS. 2A and 2B has a modified shaft 14' with a bore 14a' that is in fluid communication with the chamber 16 via an aperture 14b'. The shaft 14' passes through the bobbin 12 and is affixed to a bolt 40 on side of the bobbin 12 distal the opening 18. The bore 14a' of the shaft 14' is also in fluid communication with one or more channels 40a in the bolt 40.

At the proximal end 12a of bobbin 12, a first shim 38 is affixed that extends radially so as to block annular orifice 32. First shim 38 can flex about its centre in a direction towards opening 18 thereby restoring fluid communication through annular orifice 32, but is prevented from flexing in the opposite direction by abutment with the flux return component 26.

A second shim 42 is affixed to the bolt 40 such that it blocks channels 40a when unflexed. Second shim 42 can flex about its central point thereby unblocking channels 40a.

During the compression stroke (FIG. 2A), the shaft 14', bobbin 12 and bobbin ring 30 move collectively in the direction indicated by arrow A relative the chamber 16. The MR fluid 20 is forced through annular orifice 32 (arrows C) causing first shim 38 to flex.

During the rebound stroke (FIG. 2B) the shaft 14', bobbin 12 and bobbin ring 30 move collectively in the direction indicated by arrow B relative the chamber 16. As mentioned above, first shim 38 is prevented from flexing in a direction distal the opening due to abutment with the bobbin ring 30. The MR fluid 20 is therefore forced through aperture 14b' in shaft 14' (arrows D) during the rebound stroke. The fluid 20 flows through the bore 14a' of the shaft and into channels 40a.

The moving fluid 20 causes second shim 42 to flex allowing the fluid to exit the channels 40a at an end distal the opening 18.

The damper described with reference to FIGS. 2A and 2B provides separate rebound and compression circuits that are realised by shim stacks acting as non-return valves. A damper of this sort is suitable for use as part of the present invention.

Figure 3:
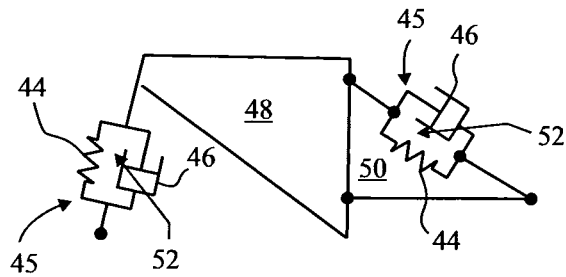
FIG. 3 shows a schematic diagram of a bicycle frame with two shock absorber systems according to the present invention.

FIG. 3 shows a schematic diagram of a bicycle frame equipped with MR dampers. The frame consists of a front triangle 48 and a rear triangle 50. The particular embodiment shown in FIG. 3 has two individual shock absorber systems 45 located at the front and rear of the bicycle frame. Each shock absorber system 45 comprises a suspension spring 44, which may be coil-over or gas spring, a controllable MR damper 46 controlled by a control system 52. The damper 46 acts to dampen the motion of suspension spring 44. In practice, a user could manually switch the current supplied to the coils of the MR damper 46, although this is less desirable than a system that switches the current in accordance with the type of terrain being traversed.

Figure 4:
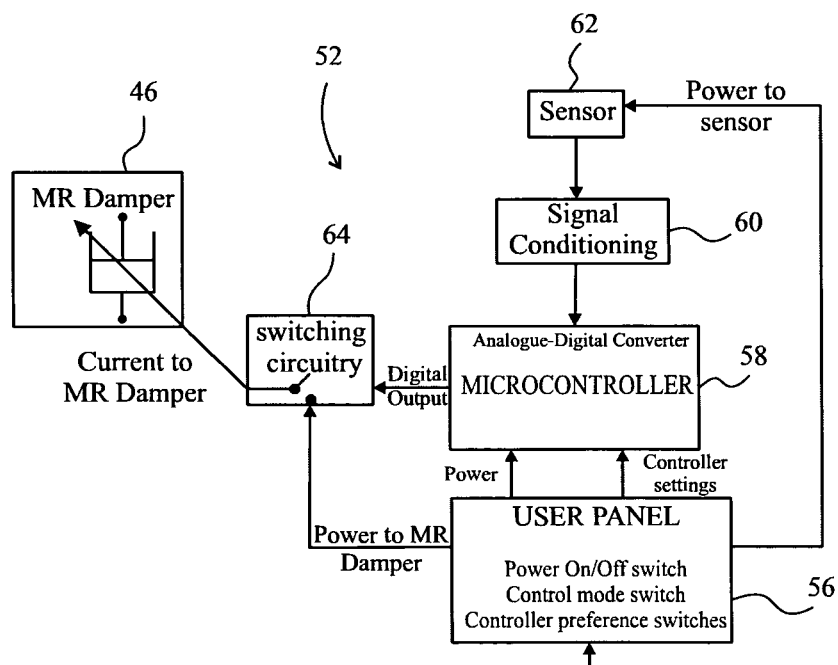
FIG. 4 shows a schematic diagram illustrating a particular embodiment of the control system.

An example of a control system that may be used to control the current supplied to the MR damper 46 is given in FIG. 4. Here, the control system 52 is connected to the MR damper 46 as already shown in FIG. 3. The control system comprises a user panel 56, a microcontroller 58, a sensor 62, signal conditioning apparatus 60 and switching circuitry 64.

A power supply 54 provides power to the control system 52 as well as providing the necessary current for the MR damper 46. In a preferable embodiment, the power supply 54 comprises a single rechargeable battery, such as a NiMH AA, lithium polymer, or lithium ion cell.

The user panel 56 provides means by which the user can alter the settings of the control system 52. This may include switching the system on or off, potentially overriding the microcontroller, or may also include the alteration of parameters relevant to the switching protocol. Adjustment of parameters is a desirable property as it allows the user to adjust the system to their specific rider preference, suspension configuration, and frame design.

The sensor 62 measures a variable (acceleration, velocity or displacement for example) and produces a signal that is conditioned by signal conditioning apparatus 60 before being passed to the microcontroller 58 where it is sampled and converted from an analogue signal to a digital signal. Signal conditioning may include, but is not limited to, passing the signal through anti-aliasing filters. The person skilled in the art will appreciate that discrete passive components could be used in place of microcontroller 58.

The variable measured by sensor 62 must be such that when combined with a time variable, the control logic of the microcontroller 58 can be interpret the signal as being indicative of the type of terrain that is being traversed by the bicycle. Such "interpretation" will depend on the predetermined settings (discussed further below) of the control logic and/or settings input by the user via user panel 56. The microcontroller produces an output signal based on the input signal, control logic and user settings, that is received by the switching circuitry 64.

In one embodiment, the switching circuitry 64 then switches the MR damper 46 current on or off depending on the output signal. In a preferable embodiment, the switching circuitry 64 comprises a relay circuit.

To ensure that the signal produced by the sensor is indicative of the terrain being traversed, the microcontroller 58 must analyse the signal in combination with a time variable such that the output signal of the microcontroller 58 is time dependent. This ensures that the microcontroller 58 interprets the signal produced by the sensor 62 in a time dependent context. In particular, a history of events is produced such that the microcontroller can perform operations based on the amount of time that has elapsed since a particular event took place. Thus, by including a time dependency, the signal can represent the behaviour of the bicycle over a finite area rather than representing the instantaneous motion of the bicycle. In the latter case, such a signal would be indicative of a particular point of land traversed by the bicycle i.e. a local feature. Conversely, the signal produced in the former case would be indicative of an area of land traversed by the bicycle that would encompass many local features. In essence, by combining the signal produced by the sensor 62 with a time variable, the overall combined signal is indicative of the terrain that being traversed by the bicycle.

Figure 5A:
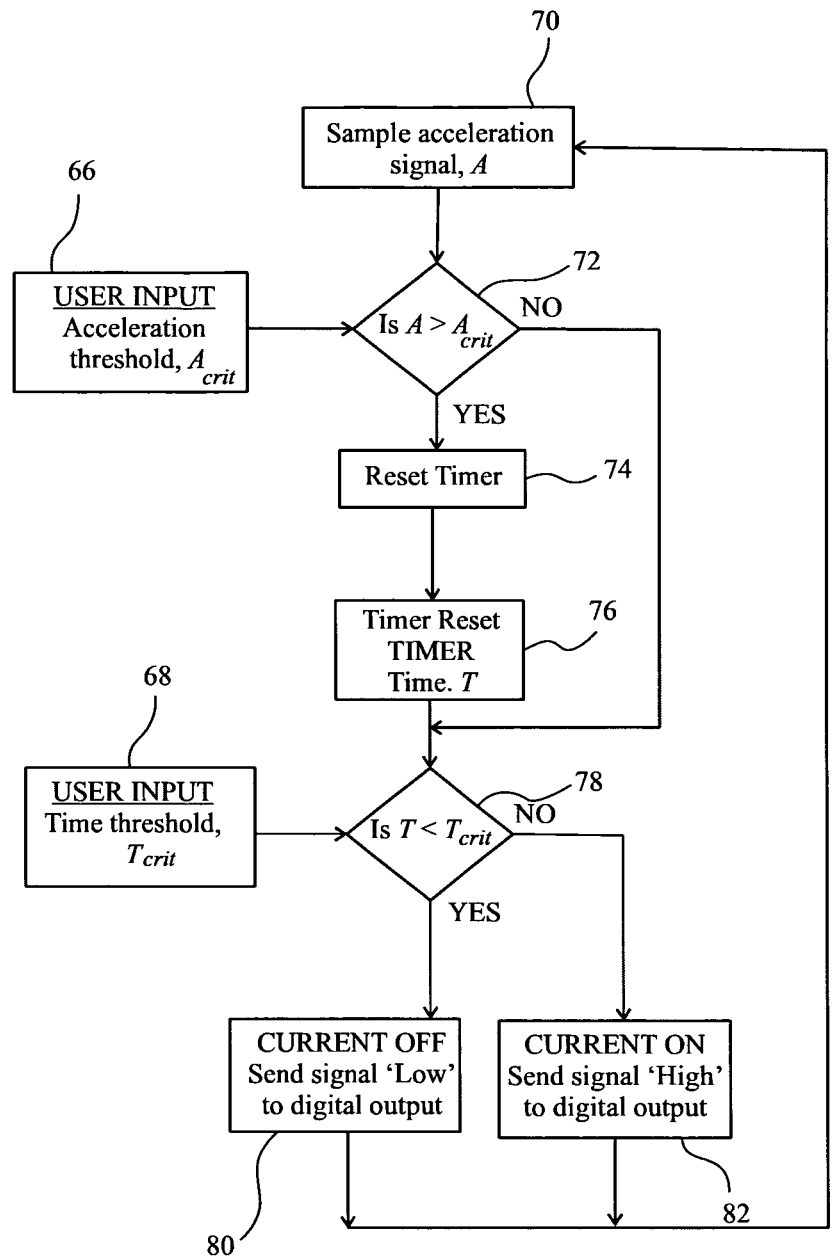
FIGS. 5A and 5B show schematic diagrams illustrating two embodiments of the control logic that may be used by the microcontroller.

FIG. 5A illustrates one particular embodiment of the control logic that may be used by the microcontroller 58. The embodiment described with reference to FIG. 5A is in relation to an acceleration signal as measured by an accelerometer, however the skilled user will appreciate that the same control logic could be applied to other signals to achieve the same end result.

A timer 76 measures time T and produces an output T signal. The output T signal is compared at 78 to a threshold value $T_{crit}$. The value of $T_{crit}$ can be predetermined or input by the user at user input 68. The preferable value of $T_{crit}$ is discussed further below. If T exceeds $T_{crit}$ then the microcontroller sends a 'high' signal 82 to a digital output that causes the MR damper current to be switched on thereby increasing the amount of damping provided. On the other hand, if T does not exceed threshold $T_{crit}$, then the microcontroller 58 sends a 'low' signal to the digital output thereby causing the switching circuitry to switch the MR damper current off.

Obviously, in the first instance T=0 and so T will be less than $T_{crit}$, and the MR damper will be switched off. After this initial situation the sampled acceleration signal A is compared to a threshold value $A_{crit}$ at 72. The value of $A_{crit}$ can be predetermined or input by the user at user input 66. The value of $A_{crit}$ should be chosen such that it is indicative of local rough terrain.

If A exceeds the threshold $A_{crit}$, then the timer is reset to zero at 74 and restarted at 76. The new time variable, T, is then checked at 78 before the process continues to either 80 or 82.

If A does not exceed the threshold $A_{crit}$ then timer continues and the time condition is checked at 78 before continuing to either 80 or 82.

The control logic described above is capable of producing a signal that will provide a high level of damping when the rider is riding on smooth terrain, thereby mitigating the effects of pedal bob, and provide a low level of damping when the rider is riding on rough terrain, thereby maximising the available suspension provided by the spring.

The control logic system will only be effective in providing soft suspension over rough terrain and hard suspension over smooth terrain if appropriate values for $A_{crit}$ and $T_{crit}$ are used. The parameter $A_{crit}$ is chosen to be equal to the level of acceleration experienced by the bicycle when travelling over a bump of the type that a multitude of which would form what the user considers "rough terrain". This is a qualitative, subjective exercise that depends on the individual rider. The present invention has the capacity to accommodate the preferences of individual users whilst still achieving its goal. $A_{crit}$ should be chosen to be greater than the vertical acceleration exerted on the bicycle due to normal pedalling alone.

It is preferable for the parameter $T_{crit}$ to be chosen considering the pedal bob frequency. A typical value of pedal bob frequency, $f_{bob}$ is 3 Hz, which is twice the frequency of one crank revolution. A suitable value for $T_{crit}$ would therefore be $1/f_{bob}=\frac{1}{3}$ sec. In this case an isolated bump in the terrain would trigger the MR damper 46 current off, but the current will switch back on before there is a chance for the rider to induce bob unless, of course, further bumps are experienced within the time $1/f_{bob}$. A larger value of $T_{crit}$ would be sub-optimal as it would allow a time period in which pedal bobbing can be experienced following an isolated bump.

Since it is preferable for the parameter $T_{crit}$ to be related to the pedal bob frequency, one embodiment of the present invention may comprise means by which the pedalling frequency (and hence the pedal bob frequency) is measured and the parameter $T_{crit}$ is actively adjusted. The pedalling frequency may be measured by a cadence meter or alternatively, a vertical dynamic quantity may be measured and analysed to determine the pedal bob frequency. For example, a Fourier transform of a time dependent dynamic data set may be used to isolate the pedal bob frequency.

The absolute minimum value for $T_{crit}$ is related to the typical bump frequency. For example, if the frequency of bumps is 20 Hz, then $T_{crit}$ must not be less than $\frac{1}{20}$ secs. A value of $T_{crit}$ lower than this would cause undesirable/rapid switching of the current over rough terrain which would be uncomfortable for the rider. It is therefore clear that the signal produced by the sensor 62 is insufficient, in isolation, to provide a control system for a suspension apparatus that adjusts itself automatically depending on the terrain being traversed.

Figure 5B:
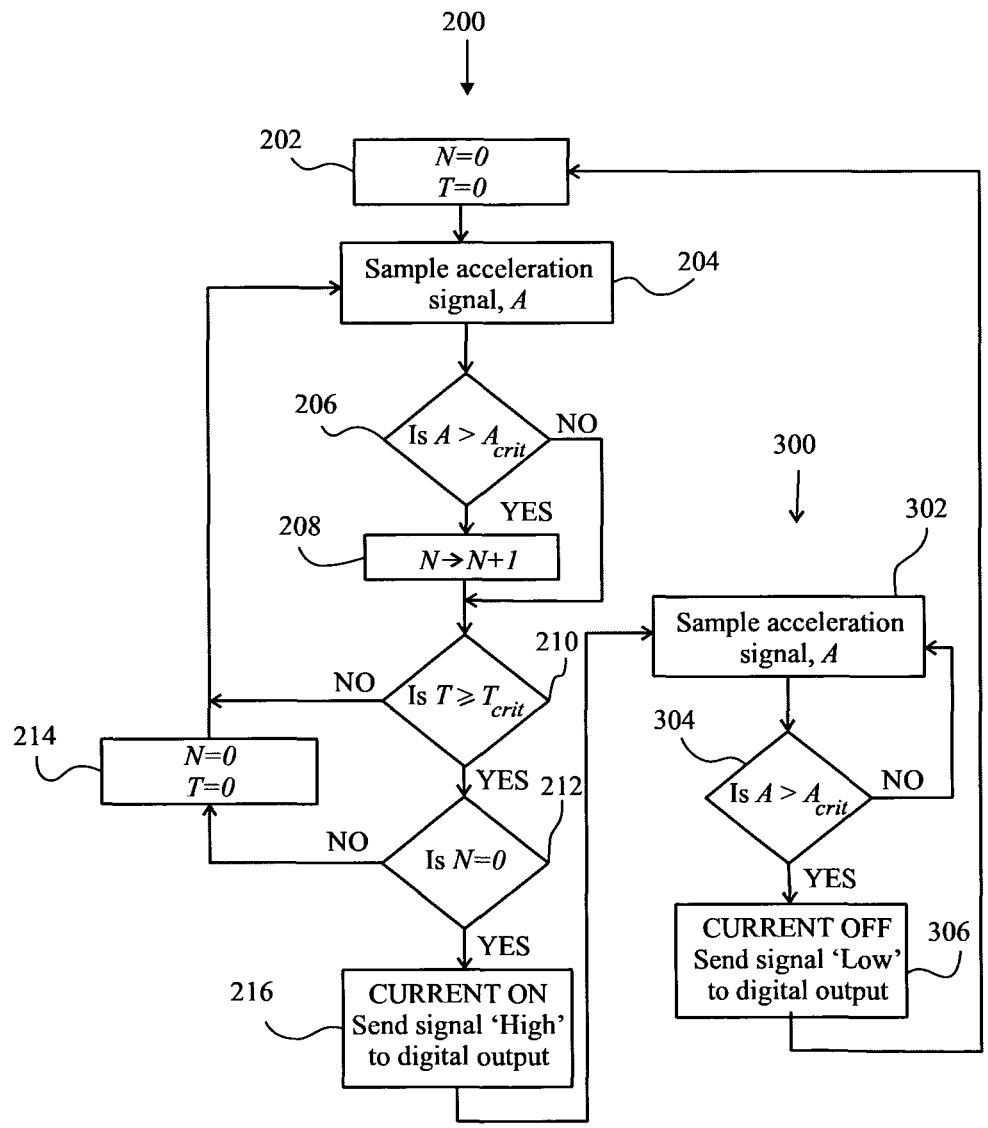

Alternative control logic is illustrated in FIG. 5B. As with FIG. 5A above, the measured dynamic quantity used in FIG. 5B is vertical acceleration, however the skilled person will appreciate that any dynamic quantity may be measured that can be used as a terrain indicator when interpreted in a time dependent setting. In both examples given, it is clear that measurement of the dynamic quantity alone would not suffice to accurately determine the type of terrain being traversed. It is the utilisation of a timer that allows the history of previous events to be considered by the control logic.

The control logic of FIG. 5B controls the level of damping by counting the number of bumps within a predetermined time period. If a threshold number of bumps are counted within the time period, then the current remains off and the level of damping is at a minimum, thereby maximising suspension. If no bumps are measured within the time period, however, then the current is switched on, increasing the level of damping. Provided that appropriate parameters are set for the length of the time period, the threshold number of bumps, and the threshold acceleration that defines a 'bump', the control logic of FIG. 5B can effectively provide high levels of damping on smooth terrain and low levels of damping on rough terrain.

As shown in FIG. 5B, the control logic comprises an ON-loop 200 and an OFF-loop 300. At the start of the process, the bump count, N, and the time variable, T, are set to zero at 202. The vertical acceleration, A, is then sampled at 204 and compared to the predetermined threshold value, $A_{crit}$, at 206. If the sampled acceleration, A, exceeds the threshold acceleration value, $A_{crit}$, then the bump count, N, is increased by one at 208. If the sampled acceleration, A, does not exceed the threshold acceleration value, $A_{crit}$, then step 208 is bypassed indicating that no bump has been detected.

At step 210, the time, T, is compared to the predetermined threshold value, $T_{crit}$. If T is less than $T_{crit}$ then the process returns to step 204 and the acceleration is sampled again. If T is equal to or greater than $T_{crit}$ then the bump count is analysed at 212 If the bump count is not equal to zero, and at least one bump was encountered within the time period, $T_{crit}$, the bicycle is travelling over rough ground and the bump count, N, and time variable, T, are reset to zero at 214 and the OFF-loop 200 is repeated from step 204. The current will therefore remain off and the level of damping will be minimised, thereby improving rider comfort.

If N is equal to zero, then no bumps were encountered within the time period, $T_{crit}$, indicating smooth ground, and the current is switched on at 216 to increase the level of damping. The value that N is compared against could be non-zero in alternative embodiments, although that would be less desirable and would mean that the system was less effective at differentiating between rough and smooth ground.

For the control logic shown in FIG. 5B, the decision to switch the current on is made on integer multiples of $T_{crit}$. To those skilled in the art, it will be obvious that this decision could be made on integer multiples of a time less than $T_{crit}$ by using suitable signal processing techniques.

Once the current has been switched on, the process enters the ON-loop 300 where the acceleration, A, is sampled again at 302. The sampled acceleration is then compared to the threshold value, $A_{crit}$, at 304. If A does not exceed $A_{crit}$ then the process returns to step 302 of the ON-loop and another acceleration sample is taken. If A does exceed $A_{crit}$ then the current is switched off once more and the process reverts back to the OFF-loop 200 where the bump count, N, and time variable, T, are reset at 202.

The two example control logic processes described above in relation to FIGS. 5A and 5B act to switch the current off if the measured dynamic quantity exceeds the predetermined threshold value. The current is only switched on if the measured dynamic quantity is below the predetermined threshold value and an additional time related condition is satisfied.

Figure 6A:
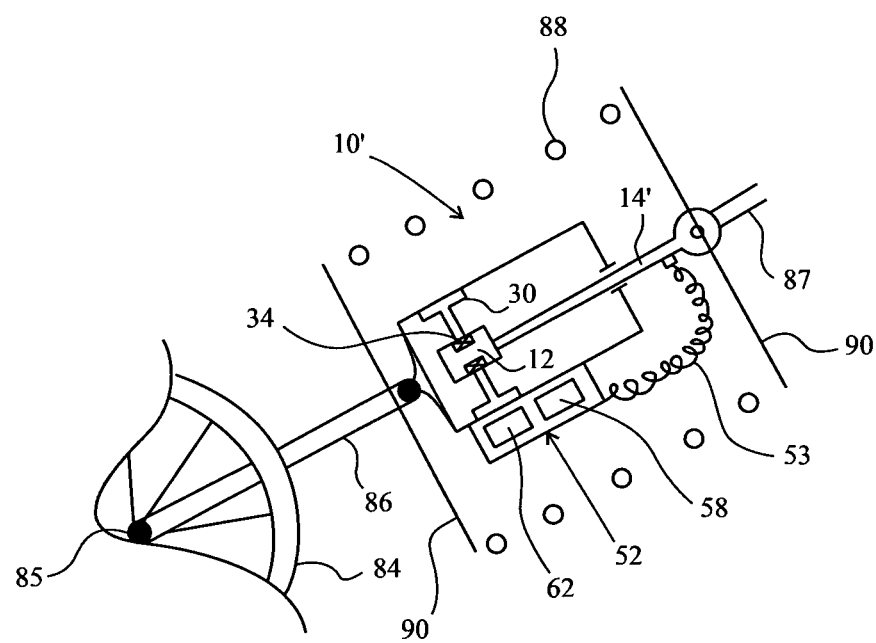
FIG. 6A shows a first embodiment of the invention connected to a coiled spring.

FIG. 6A shows a first arrangement of the invention installed on a bicycle frame. The chamber 16 of the MR damper 10' is mounted on a first part of the frame 86 that is connected to axle 85 of one of the bicycle wheels 84. Consequently, vertical movement of the wheel 84, resulting from the wheel 84 passing over a bump, for example, will cause the first part of the frame 86 and chamber 16 to move.

The shaft 14' of the damper is connected to a second part of the frame 87. First 86 and second 87 parts of the frame are therefore not rigidly connected but can move relative one another as the shaft 14' moves within the chamber 16.

The control system 52 is mounted onto the external surface of the chamber 16 and will therefore move collectively with the chamber 16, first part of frame 86, and wheel axle 85 as a consequence of the wheel 84 passing over a bump. As described above, the control system includes a sensor 62 and a microcontroller 58. The sensor will measure one or more dynamic quantities in relation to its movement and produce an output signal. The microcontroller 58 will then use the output signal in combination with a time variable to control the level of damping by adjusting the level of current supplied to coil 34 via wire 53.

While FIG. 6A shows one example of how the invention may be implemented, it is important to note that the sensor 62 should always be mounted such that it can measure a dynamic quantity that is representative of the terrain that is being traversed. It is therefore preferable that the sensor 62 be mounted where it is rigidly connected to a part of the bicycle that experiences vertical motion as a result of travel. The wheel axle 85 is therefore a particularly preferable component to which the sensor 62 should be rigidly connected although it need not be directly mounted thereto.

As shown in FIG. 6A, since the control system 52 is mounted on the chamber 16, and it is supplying current to the coil 34 which moves relative the chamber 16, wire 53 must be long enough to allow sufficient relative movement. In one preferable embodiment therefore, the wire 53 is coiled. In FIG. 6A the damper 10' acts to dampen the motion of a coiled spring 88 connected to the damper by plates 90.

Figure 6B:
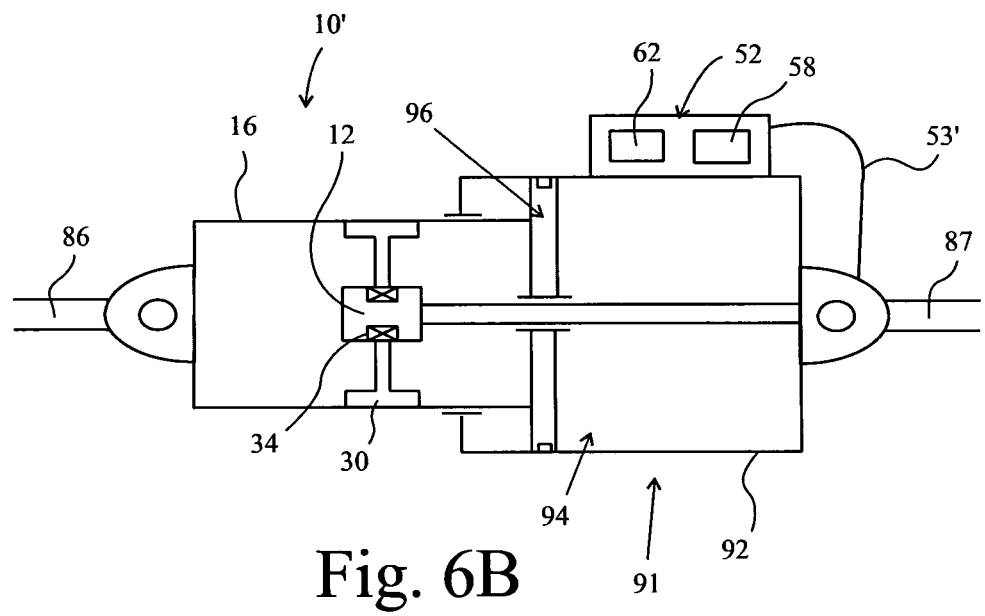
FIG. 6B shows the first embodiment of the invention connected to a gas spring.

If the damper 10' is used with a gas spring 91, as shown in FIG. 6B, the control system 52 can be mounted directly to the housing 92 of the spring 91. The spring comprises a movable air piston 96 that is slidably moveable within a gas chamber 94. In the embodiment depicted in FIG. 6B, the damper 10' is directly mounted onto the air piston 96 such that the motion of the piston 96 within the chamber 94 is damped by the motion of the bobbin 12 through the MR fluid within the damper chamber 16. Since the bobbin 12 does not move relative the control system 52 in this embodiment, the wire 53' does not need to be extendable.

Figure 7:
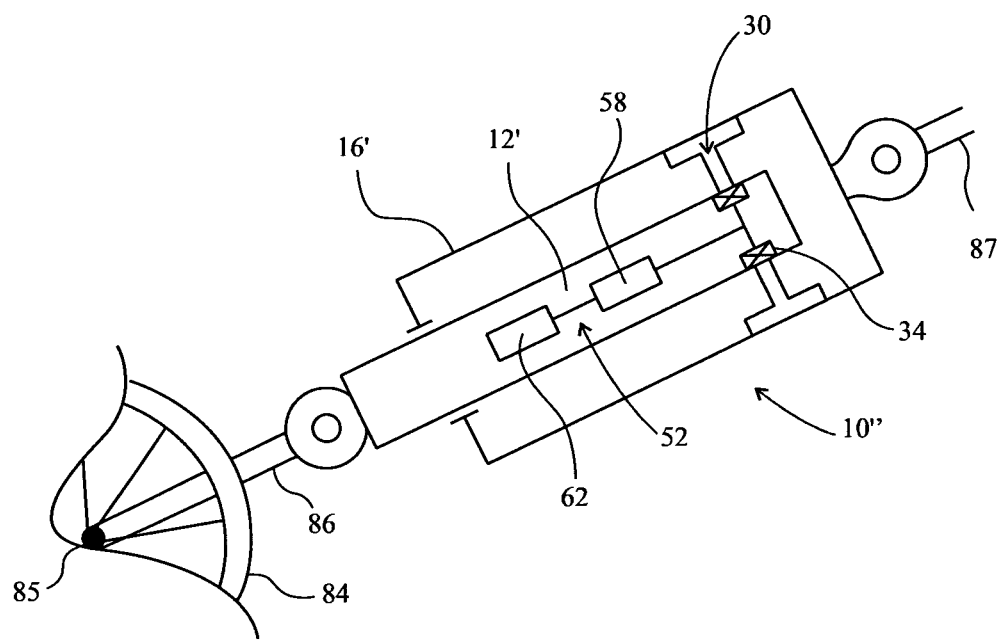
FIG. 7 shows an alternative, second embodiment of the invention.

Alternatively, a modified damper 10" wherein the sensor and microcontroller 58 are mounted on the bobbin 12' may be used. This embodiment is shown in FIG. 7 and allows for a second arrangement of the invention installed on a bicycle frame. In this case, the bobbin 12' is connected to the first part of the bicycle frame 86 which is connected to the wheel axle 85 of the bicycle wheel 84. The surrounding chamber 16' can move relative the bobbin 12' and is connected to the second part of the frame 87.

This third arrangement mitigates the requirement of wires external the damper 10" entirely although does require that the bobbin 12' is sufficiently large to house the control system 52. In all three arrangements depicted in FIGS. 6A, 6B and 7, the control system and coils require a power source. This may be mounted onto the control system or mounted remotely and include wires to supply power to the components, although this is less desirable.

In a further aspect of the invention, an MR damper is provided having means to manually adjust the level of damping on the rebound stroke. As described above, it is desirable for the rebound stroke of the suspension system to be damped more than the compression stroke. It is further desirable to have a damper that allows the user to adjust the level of rebound damping. When considering an MR damper having wires and electrical components within the bobbin and shaft, traditional methods of manual rebound adjustment become complicated and difficult to construct. The MR shaft and bobbin arrangement shown in FIGS. 8A and 8B overcomes this problem by utilising flexible shims. The skilled person will note that even though the following arrangement is particularly suited to semi active dampers, it could equally be applied to any damper (semi-active or passive).

Figure 9A:
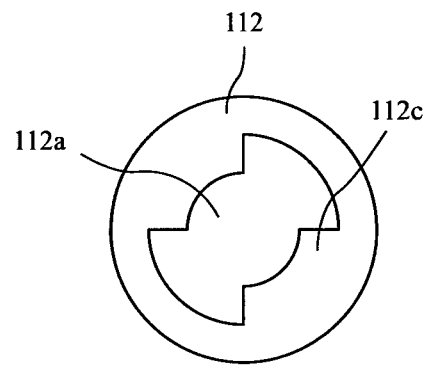
FIGS. 9A to 9C show detailed views of each shim of the shim stack.
Figure 9B:
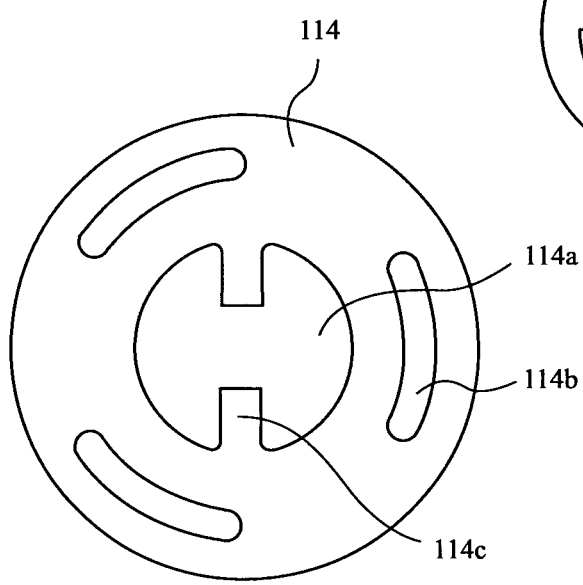
Figure 9C:
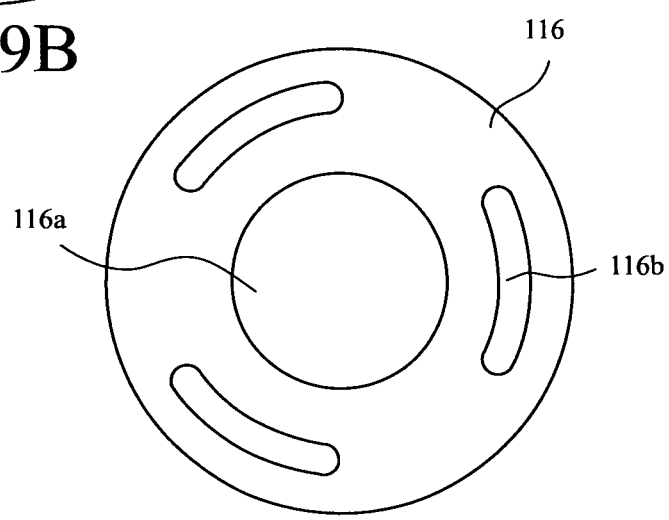

As shown in FIG. 8A, a shaft 104 is connected to a bobbin 108 that has an electromagnetic coil (not shown). The bobbin 108 is connected to and circumscribed by a bobbin ring 110 which acts as a flux return component. The space intermediate the bobbin 108 and bobbin ring 110 defines an annular orifice 109 that allows the passage of MR fluid from a bottom end 108a of the bobbin 108 to a top end 108b. At the top end 108b there are three shims 112, 114 and 116 forming a shim stack. The shims 112, 114 and 116 are shown in more detail is FIGS. 9A, 9B and 9C respectively.

The bottom shim of the stack is a fixed shim 116. The fixed shim 116 is prevented from moving due to abutment between a shoulder 104a of the shaft 104 and the bobbin 108. The fixed shim 116 has a central aperture 116a through which the shaft 104 passes and extends radially from the shaft 104, over the annular orifice 109, such that it is disposed above the bobbin ring 110. The fixed shim 116 has a plurality of orifices 116b following a circumferential path around the surface of the shim 116. The radius of the circumferential path is such that the orifices 116b are aligned with the annular orifice 109.

Disposed on top of the fixed shim 116 is a rotating shim 114. The rotating shim 114 has the same diameter as the fixed shim 116 and also has a central aperture 114a and orifices 114b that follow a circumferential path such that they are radially aligned with the orifices 116b of the fixed shim 116 and the annular orifice 109. The skilled reader will note that the rotating shim 114 and the fixed shim 116 need not necessarily have the same diameter, although it is critical that orifices 114b and 116b can be aligned with one another when the shims 114 and 116 are in place. The diameter of the central aperture 114a is equal to or slightly greater than the diameter of the shaft 104 ensuring that the rotating shim 114 is not trapped during assembly. In addition, the rotating shim comprises a plurality of tabs 114c that extend radially into the central aperture 114a. The tabs pass through slots (not shown) in the shoulder 104a of shaft 104 and are fixed in a twister 102. The twister 102 is disposed within and is coaxial with the shaft 104 and protrudes from the top end such that a part 102a of the twister 102 is exposed. The twister 102 is journalled for rotation within the shaft 104 and can be rotated by turning the exposed part 102a. Rotation of the twister 102 causes the rotating shim 114 to rotate also. The device is sealed by o-rings in grooves 106 on the bobbin 108 and grooves (not shown) on twister 102.

A support shim 112 provides support to the shim stack and provides protection to the tabs 114c of the rotating shim 114. The support shim also has a central aperture 112a and a plurality of tabs 112c that locate into the slots (not shown) in the shaft 104. The shims 112, 114 and 116 are free to flex upwards, away from the bobbin 108, if subjected to the appropriate forces. They are however prevented from flexing in the opposite direction due to abutment with the bobbin 108 and bobbin ring 110.

During the compression stroke, the shaft and bobbin assembly moves downward within the chamber. Fluid is forced upwards through the annular orifice 109 and causes the shims 112, 114 and 116 to flex upwards. The flow of fluid is relatively unrestricted by the shims 112, 114 and 116 which do therefore not affect the level of damping during compression.

During rebound, however, the shaft and bobbin assembly moves upward within the chamber and fluid is forced to flow downwards through the annular orifice 109. The shims 112, 114 and 116 are urged downwards by fluid pressure as the bobbin 108 moves upwards but are prevented from flexing downwards. Fluid can only enter the annular orifice 109 therefore, by passage through orifices 114b and 116b. The restricted flow through the orifices 114b and 116b results in a higher level of damping on the rebound stroke as compared to the compression stroke. The actual level of damping is determined by the total area of orifice available for the fluid to flow through. This is dependent on the relative positions of the rotating shim 114 and fixed shim 116 and hence the relative positions of orifices 114b and 116b. Thus, a user can adjust the level of rebound damping by rotating the rotating shim 114 relative to the fixed shim 116 by rotation of the twister 102. Minimum resistance to fluid flow and hence minimum rebound damping will be achieved when the orifice 114b of the rotating shim 114 is in precise alignment with the orifice 116b of the fixed shim.

The skilled reader will appreciate that the specific design of the shims described above is not limiting to the scope of the invention. In particular, the shim orifices 114b, 116b may be different shapes to the ones depicted in FIGS. 9A-9C, the shims 114, 116 may comprise more or fewer orifices 114b, 116b than three and the rotating and support shims 114, 112 may have more or less than two tabs 114c and 112c. Tabs 112c on the support shim 112 could in fact be avoided altogether through the inclusion of a second shoulder above shoulder 104a. This would make installation of the support shim 112 more straightforward.

Whilst it is recognised that rebound adjustment for a semi-active damper could be achieved using electronic controls, a mechanical adjustment greatly simplifies the control logic and conserves battery power.

It has been demonstrated above that the present invention provides a controllable damper system that is simple in construction and compact thereby allowing easy installation on the frame of a bicycle. The damper system automatically adjusts the level of damping to an optimum level as a result of at least one measured dynamic quantity in combination with a time variable. The present invention is therefore particularly effective in providing a working damping system while preventing the phenomenon of pedal bob.

The skilled reader will appreciate that the embodiments described above could be easily be modified to incorporate an electrorheological damper system, without undue inventiveness. It is therefore assumed the description and claims encompass both magnetorheological and electrorheological systems.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An apparatus of a damper for a bicycle comprising a housing defining a chamber;
   a piston, movable in the chamber along a first direction controllable means to vary the resistance to movement of the piston in the chamber;
   a sensor; and
   a controller including a timer, wherein said sensor measures at least one dynamic quantity and produces an output signal based thereon;
   said output signal is received by the controller;
   said controller controls said controllable means based on said dynamic quantity as a function of time to control the level of damping; and
   wherein said function is based on said dynamic quantity satisfying a threshold value on sufficient occasions within a specific time period;
   said specific time period is actively adjusted in response to a measured quantity; and
   said specific time period is a function of the pedaling frequency, f.

2. Apparatus according to claim 1, further comprising a fluid having variable apparent viscosity in the chamber displaced by the piston, wherein the damping properties of the damper are affected by the apparent viscosity of the fluid; and
   said controllable means comprises a pole associated with the chamber that changes the apparent viscosity of the fluid when activated.

3. An apparatus as claimed in claim 2, wherein said controller controls the viscosity by varying a current supplied to said pole, said current having any value between an upper limit and a lower limit.

4. An apparatus as claimed in claim 3, wherein a RCL (resistor-capacitor-inductor) network is used to control the rate of change of current.

5. An apparatus as claimed in claim 3, wherein said current upper limit is a function of said output signal.

6. An apparatus as claimed in claim 2, wherein said fluid is a magnetorheological fluid.

7. An apparatus as claimed in claim 6, wherein said pole is a magnetic pole.

8. An apparatus as claimed in claim 2, wherein said fluid is an electrorheological fluid.

9. An apparatus as claimed in claim 8, wherein said pole is an electric pole.

10. An apparatus as claimed in claim 2, wherein said controller controls the viscosity by means of a switching circuit.

11. An apparatus as claimed in claim 10, wherein said switching circuit is a relay circuit.

12. Apparatus as claimed in claim 2, wherein said fluid has a first apparent viscosity when said dynamic quantity satisfies said threshold value, and has a second apparent viscosity when said dynamic quantity does not satisfy said threshold value.

13. Apparatus as claimed in claim 12, wherein said first apparent viscosity is less than said second apparent viscosity.

14. Apparatus as claimed in claim 2, wherein said specific time period is measured by said timer being actuated upon the first occurrence of said dynamic quantity satisfying said threshold value.

15. Apparatus as claimed in claim 1, wherein said threshold value is a function of a second dynamic quantity.

16. Apparatus as claimed in claim 15, wherein said second dynamic quantity is a function of the level of damping.

17. Apparatus as claimed in claim 15, wherein said second dynamic quantity is a function of the forward velocity of the bicycle.

18. An apparatus as claimed in claim 1, wherein said output signal is an analogue signal and is passed through a signal conditioning filter.

19. An apparatus as claimed in claim 18, wherein said signal conditioning filter is an anti-aliasing filter.

20. An apparatus as claimed in claim 18, wherein said output signal is passed through an analogue-to-digital converter prior to being received by said controller.

21. Apparatus as claimed in any preceding claim, wherein said damper acts to dampen the motion of a spring.

22. Apparatus as claimed in claim 21, wherein said spring is a coiled spring.

23. Apparatus as claimed in claim 21, wherein said spring is a gas spring.

24. Apparatus as claimed in claim 1, wherein said function is based on said dynamic quantity satisfying a threshold value twice within a specific time period.

25. Apparatus as claimed in claim 1, wherein said threshold value is satisfied when said dynamic quantity exceeds said threshold value.

26. Apparatus as claimed in claim 1, wherein said specific time period is adjustable by the user.

27. Apparatus as claimed in claim 1, wherein said pedaling frequency is measured by a cadence meter.

28. Apparatus as claimed in claim 1, wherein said pedaling frequency is measured by Fourier transforming a measured set of time dependent variables.

29. Apparatus as claimed in claim 1, wherein said specific time period is between $1/(2.5\ f)$ and $1/(1.7\ f)$.

30. An apparatus as claimed in claim 1, wherein said specific time period is between 0.3 and 0.4 seconds.

31. Apparatus as claimed in claim 1, wherein said threshold value is adjustable by the user.

32. An apparatus as claimed in claim 1, wherein said dynamic quantity is a function of acceleration.

33. An apparatus of a damper comprising a piston having a shaft;
    a bobbin mounted at a bottom end of said shaft, wherein said bobbin is connected to and circumscribed by a bobbin ring;
    a discontinuous annular orifice intermediate said bobbin and bobbin ring;
    a shim stack comprising two or more shims, said shims extending across said annular orifice;
    wherein said shims can flex permitting substantially unrestricted fluid flow through said annular orifice during a compression stroke, but are prevented from flexing during a rebound stroke, thereby restricting fluid flow through said annular orifice;
    said shims comprise apertures that in combination form a fluid passageway, where said fluid passageway is in fluid communication with said annular orifice; and
    said shims are movable with respect to one another such that the size of said fluid passageway is adjustable thereby adjusting the rate of fluid flow through said annular orifice.

34. A piston as claimed in claim 33, further comprising a rotating rod journalled for rotation in said shaft, wherein said movable shim is connected to said rotating rod such that rotation of said rotating rod causes rotation of said movable shim relative said remaining shim or shims.

* * * * *